F. L. SESSIONS.
CHUCK.
APPLICATION FILED AUG. 5, 1913.
1,087,327.
Patented Feb. 17, 1914.
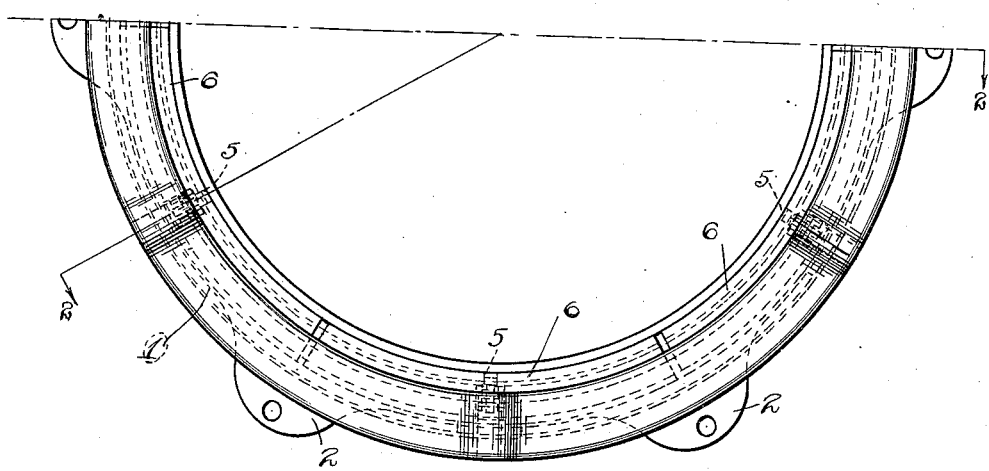
Fig-1-
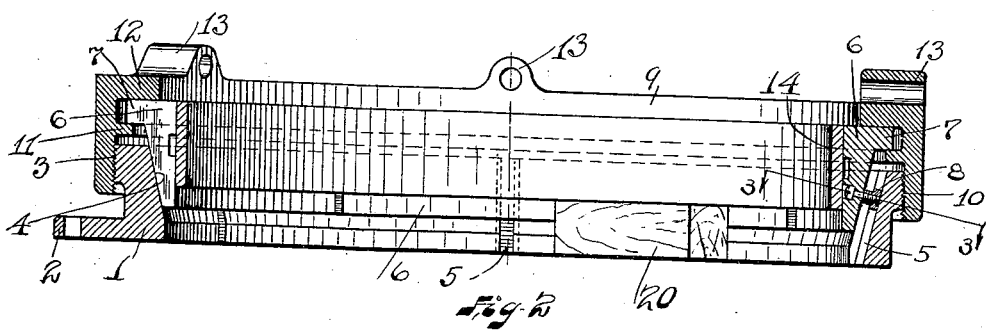
Fig-2
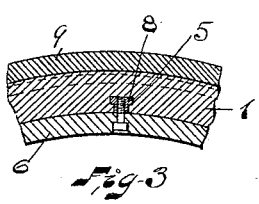
Fig-3
Witnesses
Oliver M. Kappler
H. M. Kathe
Inventor
Frank L. Sessions
By Fay & Oberlin
Attorneys

UNITED STATES PATENT OFFICE.

FRANK L. SESSIONS, OF LAKEWOOD, OHIO, ASSIGNOR TO THE STANDARD WELDING COMPANY, OF CLEVELAND, OHIO, A CORPORATION OF OHIO.

CHUCK.

1,087,327.  Specification of Letters Patent.  Patented Feb. 17, 1914.

Application filed August 5, 1913. Serial No. 783,029.

*To all whom it may concern:*

Be it known that I, FRANK L. SESSIONS, a citizen of the United States, and a resident of Lakewood, county of Cuyahoga, and State of Ohio, have invented a new and useful Improvement in Chucks, of which the following is a specification, the principle of the invention being herein explained and the best mode in which I have contemplated applying that principle, so as to distinguish it from other inventions.

The subject of the present invention is a chuck which is adapted to receive large members for working, the chuck being here illustrated in connection with a rim such as is used for automobile tires, although it will be understood that the chuck is not limited to this use. In my improved chuck a plurality of segmental blocks are used, each of which is held in position upon a suitable face plate, all of the blocks being moved transversely of the inner face of the face plate and simultaneously radially inward upon the operation of a single member which engages all of the blocks.

To the accomplishment of these and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—Figure 1 is a plan view of half of my improved chuck; Fig. 2 is a section on the line 2—2 in Fig. 1; and Fig. 3 is a section on the line 3—3 in Fig. 2.

The chuck here illustrated is adapted to be connected to a boring mill, a suitable face plate 1 being provided, such face plate having a plurality of lugs 2 for attachment to the face of the boring mill. The face plate is provided externally with a threaded surface 3 and internally with a beveled surface 4. At intervals around the beveled surface there are formed T-shaped grooves 5.

Slidably mounted on the inner face of the face plate are a plurality of segmental blocks 6, such blocks being provided with an externally beveled surface and with a lip or flange 7 extending laterally from the upper portion of the blocks. In each of the blocks there is mounted one or more guide members 8 adapted to snugly but slidably engage in the T-shaped grooves in the face plate.

An annular member 9 is attached externally of the segmental blocks 6, and is threaded internally at 10 adapting it to adjustably engage over the threading 3 on the exterior of the face plate. The annular member is provided with two spaced flanges 11 and 12 which contact on either side of the flange 7 on the segmental blocks. Socket members 13 are formed on the upper side of the annular member for the purpose of receiving bars for convenient rotation and adjustment of this member.

In operation the annular member is moved downwardly toward the face plate thus drawing the segmental blocks radially inward and downward into the face plate until they securely grip the rim 14. The rim can then be faced on its outer edge, or threaded internally, which are the two operations that are commonly performed upon such an article. For convenience I employ supports 20, generally wooden blocks, to limit the position of the rim, the supports being placed on the face of the boring mill.

The advantages of the present chuck are its simplicity, there being but two main members and a plurality of segments, together with the ease of adjustment. As to adjustment, it is only necessary to rotate the annular member in the proper direction. It will also be noted that the segmental blocks are moved across the face plate and radially inward simultaneously and evenly, thus securing a proper clamping on the article which is to be operated upon.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a chuck, the combination of an open annular internally beveled face plate having transversely extending grooves in the beveled surface; a plurality of segmental blocks slidably contacting the beveled surface of said plate; members attached to said blocks and snugly but slidably engaging in such grooves in the surface of said plate; and means adapted to simultaneously move said blocks across the beveled surface of said plate.

2. In a chuck, the combination of an open annular internally beveled face plate having transversely extending undercut grooves in the beveled surface; a plurality of segmental blocks slidably contacting the beveled surface of said plate, each of said blocks having a laterally projecting lip; members attached to said blocks and slidably engaging in such undercut grooves in said plate; and an annular member having a flange adapted to contact such lip on said blocks, said member adjustably engaging externally on said plate, whereby adjustment of said annular member moves said blocks simultaneously across the beveled surface of said plate.

Signed by me this 2nd day of August, 1913.

FRANK L. SESSIONS.

Attested by—
H. B. FAY,
A. L. GILL.

---

Copies of this patent may be obtained for five cents each, by addressing the "Commissioner of Patents, Washington, D. C."